United States Patent [19]

Arvesen

[11] 4,019,202

[45] Apr. 19, 1977

[54] AUTOMATIC SHUT-OFF CIRCUIT FOR EIGHT-TRACK TAPE PLAYERS AND THE LIKE

[76] Inventor: John P. Arvesen, c/o Universal Sound, Inc., 110 S. Court, Fairfield, Iowa 52556

[22] Filed: Sept. 24, 1975

[21] Appl. No.: 616,441

[52] U.S. Cl. .............................. 360/74; 200/61.14; 318/466
[51] Int. Cl.² ................. G11B 15/06; G11B 15/52; G11B 19/20
[58] Field of Search ....................... 360/74, 71, 61; 318/468, 345 E, 345 G, 466; 307/99; 200/61.13, 61.14

[56] References Cited

UNITED STATES PATENTS

| | | | |
|---|---|---|---|
| 3,250,978 | 5/1966 | Moscardi | 318/345 E |
| 3,617,837 | 11/1971 | Beck | 318/466 |
| 3,621,295 | 11/1971 | Callan | 318/345 G |
| 3,800,316 | 3/1974 | Kuharchuk | 360/74 |
| 3,940,672 | 2/1976 | Vogel | 360/74 |
| 3,952,330 | 4/1976 | Rimkus et al. | 360/74 |

*Primary Examiner*—Alfred H. Eddleman
*Attorney, Agent, or Firm*—Haven E. Simmons; James C. Nemmers

[57] ABSTRACT

A simplified but stable and rugged circuit is disclosed which when applied to an eight-track tape player, for instance, automatically stops the player after one complete program in order to avoid tiresome or irritating repetition of the program.

4 Claims, 2 Drawing Figures

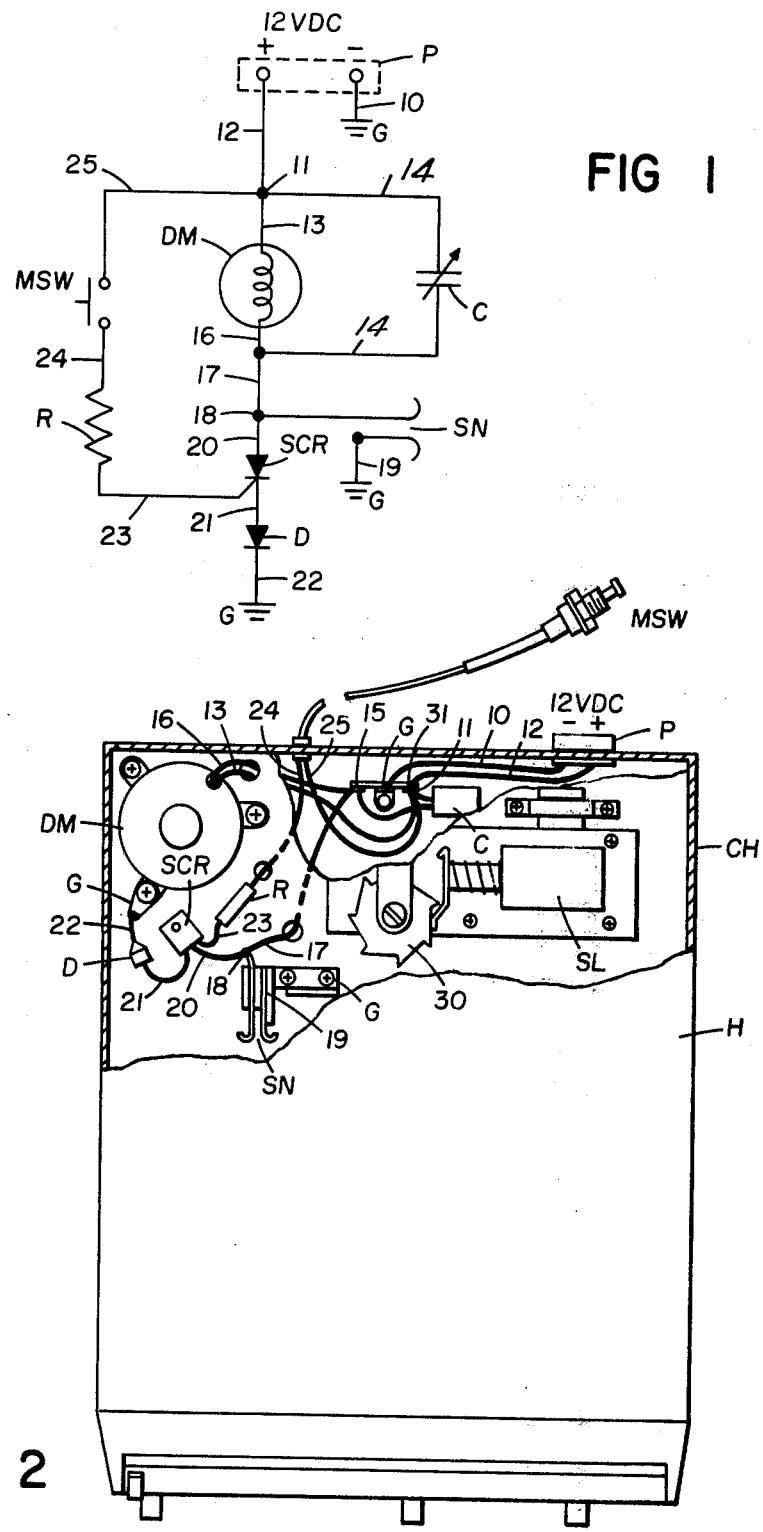

AUTOMATIC SHUT-OFF CIRCUIT FOR EIGHT-TRACK TAPE PLAYERS AND THE LIKE

BACKGROUND OF THE INVENTION

The context in which the present invention arose is that of sales presentation, particularly by means of talking displays. Rather than having prospective customers always confronted by salespersons, a customer entering a place of business has the option instead, if he is interested, of pushing a small button to activate an eight-track tape player serving as the vocal part of a sales display and presentation. With the circuit of the present invention incorporated into the player, the latter automatically shuts itself off rather than repeating its program until manually stopped. That is to say, the tape player is shut down automatically at the end of a single track rather than at the end of all tracks. Then if the customer is still interested in whatever product or service is being promoted he can seek out a salesperson; if not, he can simply leave.

Devices and circuits which accomplish the foregoing are not, of course, in and of themselves new. But all of the present ones, so far as known, are relatively complicated, expensive or unreliable or a combination of several or all of these demerits. The chief object and feature of the present invention, accordingly, is a circuit which automatically shuts suts down an eight-track tape player or the like after a single complete program has been played and yet is simple and very inexpensive as well as reliable.

SUMMARY OF THE INVENTION

The circuit of the present invention consists essentially of no more than a normally open momentary switch, a resistor, a capacitor, a diode, a silicon controlled rectifier ("SCR") and a simple sensor of the tape itself. All of these components, some of which are already present in a typical eight-track tape player, are simply added to or rearranged in, as the case may be, the power supply circuit for the tape player's motor.

A particularly distinguishing feature of the circuit is the use of an SCR rather than a transistor, vacuum tube or other form of switching device, such as a reed type relay. The latter are normally replaced with vacuum tubes or by transistors in applications of the type concerned. An SCR is not normally thought of as still another substitute in applications of this nature. Rather SCRs are usually considered in the context of "industrial" applications because they are more rugged than vacuum tubes or transistors and, particularly as compared with transistors, are better able to accommodate higher operating temperatures.

In the circuit of the present invention the use of a SCR rather than a transistor (or other switching device) not only adds to the durability and stability of the circuit but greatly reduces its cost, the latter being on the whole less than 25% of the cost that would be entailed were, for instance, transistors or reed relays used. In addition the circuit provides a measure of overload protection for the transistors in the audio system of the player in a manner to be later described. These features of the circuit, plus its simple nature and the fact that it can be readily incorporated into the circuit and structure of existing eight-track tape players, either initially when produced or later by simple modification, all add to the attractiveness and utility of the present invention as will become apparent from the drawings and the more detailed description which follows.

BRIEF DESCRIPTION OF THE DRAWINGS

FIG. 1 is a schematic of the power circuit for an eight-track tape player drive motor incorporating the present invention.

FIG. 2 is a top plan view of a typical eight-track tape player with certain portions of the housing and chassis cut away to illustrate an actual example of a tape player modified to include the circuit of FIG. 1.

DETAILED DESCRIPTION OF THE PREFERRED EMBODIMENT

In FIG. 1, the induction type drive motor DM of an eight-track tape player is supplied with 12 VDC through a plug P from a suitable power source as indicated. The negative side of the power source is connected by a line 10 to the chassis CH (see FIG. 2) in order to provide a common ground G for all circuits of the tape player. The positive side of the power source is connected at 11 by a line 12 to one power input 13 of the motor DM while the leads 14 of a variable filter capacitor C (which may be of fixed value in the case of a particular drive motor) are also connected at 11 and at 15 in parallel with the motor windings between the motor power input 13 and its other power input 16. A line 17, also connected at 15 to the motor power input 16, is attached in turn at 18 to the insulated side of the two contacts of the tape sensor SN, the other sensor contact being connected to chassis ground G at 19. To the connection 18 is also attached the anode 20 of a silicon controlled rectifier SCR, its cathode 21 being connected to the anode of a diode D whose cathode in turn is connected to chassis ground G at 22. The gate 23 of the SCR is connected through a voltage dropping resistor R and a line 24 to one side of a single pole, momentary contact switch MSW whose other side is connected by a line 25 to the positive side of the power source at 11.

When the switch MSW is momentarily closed, a circuit is completed through lines 24 and 25 and the resistor R to the gate 23 of the SCR. The resistor R, which in the example at hand carries a rating of 100K ohms at ½ watt, serves to drop the 12 VDC from the connection 11 to a level which is safe for the gate 23 of the SCR. Accordingly, the latter is turned on and will conduct from its anode 20 to its cathode 21 and continue to do so as long as the current through the SCR is above its holding current, determined of course by the design properties of the SCR. In the present example the SCR is a HEP R1215-Thyristor whose peak gate voltage is 6 VDC and whose holding current is 5 milliamperes. Since a circuit through the lines 12 and 13, the windings of the motor DM, the lines 16 and 17, the SCR, and the diode D is thereby completed from the positive side of the power source to chassis ground G, the negative side of the power source, the SCR will remain on even though the switch MSW is released. Hence the motor DM will run and the tape play. The diode D, while not strictly necessary, nevertheless increases stability of the circuit in that it blocks any feedback of current from the chassis ground G which might occur and which might in turn shut down the SCR. With the diode D installed the SCR circuit is completely isolated from any feedback. The capacitor C, with which tape player drive motors are usually equipped, absorbs or smooths any inductive "spikes" caused by the motor DM which could affect the conductivity of the SCR.

The tape itself, as is typical, is equipped with a length of conductive foil along and across all four of its two-channel tracks in order to signal the beginning and end of each track and thus program. When the foil arrives at the sensor SN, closing the circuit through its contacts, the SCR is in effect shunted so that all current passes directly to ground G through the line 19 and none through the SCR. Hence, since there is no longer any holding current for the SCR, the latter is turned off. The motor DM, however, continues to run, owing to the fact that the sensor SN still provides a completed circuit through the motor windings, until the foil passes the sensor SN, thereby opening the circuit to the motor windings and shutting down the motor DM. Since the sensor SN then no longer shunts the SCR, the latter is ready to restart the motor DM whenever the switch MSW is closed. Accordingly, once the motor DM is started at the beginning of one program on the tape, it will automatically shut down upon the completion of the program without repeating it. Of course, by placing additional foil on the tape the present circuit can be adapted to instances where less than the length of one track is needed for a program.

Referring now to FIG. 2, the eight-track tape player shown is an "Apollo XVI" manufactured by the Boman Astrosonix Division of Boman Industries at Downey, Calif., and is typical of the kind concerned. A stepper assembly 30, activated by the foil on the tape and a solenoid SL, normally moves the pickup head (not shown) to each successive track at the completion of the program on the prior track. When the tape player is modified to incorporate the circuit of the present invention, essentially the following changes are made: The cover H is removed and the pickup head is set in the middle of the tape, i.e., track 2 or 3. The solenoid SL is completely deactivated by cutting all leads to it and removing the diode normally connected across it, so that the pickup head remains fixed. The chassis CH is then inverted and the lead of the condenser C normally connected to chassis ground G on a terminal strip 31 beneath the chassis CH is removed and reconnected on the terminal strip 31 at 15 (to which the motor power input 13 is already connected as well as the lead 17 from the insulated side of the sensor SN). The SCR is then installed, its anode 20 being connected to the insulated side of the sensor SN at 18 and its cathode 21 to the anode of the diode removed from the solenoid SL (which thus becomes the diode D) whose cathode is connected at 22 to chassis ground G. Finally, the switch MSW is wired up, one side 24 being led through the resistor R to the gate 23 of the SCR and the other side 25 to the positive side of the 12 VDC source at 11 on the terminal strip 31. After suitable insulation of the components, especially around the resistor R, the cover H is reinstalled and the modified tape player is then ready for operation. For that purpose, the player may be mounted somewhere convenient in or being a talking sales display with its speakers and momentary start switch MSW located for access by prospective customers.

From the foregoing it will be apparent that the only essentially additional components necessary to incorporate the circuit of the present invention into an existing eight-track tape player are the SCR, the resistor R, the switch MSW and a few lengths of connecting wire, the condenser C and the diode D being already found in the tape player. The cost of all these additional components together is, at the present, only about 25% or even less of the cost of a single reed-relay or a transistor which has been or is typically used for the same or similar purposes. The innate low cost of the circuit of the present invention, the obvious ease with which it can be incorporated into existing eight-track tape players, its simplicity, stability and ruggedness, all demonstrate the utility and attractiveness of the present invention.

The installation of the circuit also produces still another benefit. When a tape player of the kind concerned is operated at peak volumes, the pre-amp and output transistors in its audio circuits are often damaged owing to current overload. Normally, the current through the player is about 7–10 milliamperes. When the present circuit is installed, its SCR requires about 5 milliamperes in order to hold on. If the volume is turned up to the point where the audio transistors become susceptible to damage, enough current is thereby taken from the SCR holding circuit to turn it off, shutting down the motor and thus relieving any overload as well as providing an audible warning signal.

It will be apparent, of course, that the circuit of the present invention can be incorporated in an eight-track tape player during its initial manufacture, perhaps in integrated circuit form, or can be adapted to a "plug-in" form whereby the tape player could be readily converted back and forth depending upon the manner in which it is to be used. Hence, though the present invention has been described in terms of a particular embodiment, being the best mode known of carrying out the invention, it is not limited to that embodiment alone. Instead, the following claims are to be read as encompassing all adaptations and modifications of the invention falling within its spirit and scope.

I claim:
1. In an eight-track tape player or the like having a tape drive motor of the direct current type with first and second power inputs, the first and second motor power inputs being respectively connectible in series to the first and second sides of a source for direct current power, the improvement comprising: an electric circuit for automatically shutting off the drive motor upon the completion of a taped program, the circuit consisting of a silicon controlled rectifier disposed between the second motor power input and the second side of the source for direct current power, the anode of the rectifier being connected in series with the second motor power input and its cathode being connected in series with the second side of the source for direct current power; a normally open motor start switch of the momentary contact type and a voltage dropping resistor connected in series with each other and disposed between the first side of the source for direct current power and the gate of the rectifier; a stabilizing diode disposed between the silicon controlled rectifier and the second side of the source for direct power, the anode of the diode being connected in series with the cathode of the rectifier and the cathode of the diode being connected in series with the second side of the source for direct current power; and a tape sensor having a pair of circuit making contacts connected in shunt relation with the rectifier, the sensor being adapted to contact the tape and to have the circuit closed through its contacts by means carried by the tape.

2. The circuit of claim 1 including a filter capacitor connected in parallel with the drive motor between its first and second power inputs.

3. The circuit of claim 2 wherein the capacitor is a variable capacitor.

4. The circuit of claim 1 wherein one of the contacts of the sensor is connected between the second motor power input and the anode of the rectifier and the other sensor contact is connected in series with the second side of the source for direct current power.

* * * * *